April 26, 1932.   A. SHAPIRO   1,855,775
FILM TENSIONING MEANS FOR CINEMATOGRAPHS
Filed March 20, 1930    3 Sheets-Sheet 1

Witnesses
Arthur M. Framke.
Wm. E. Anderson,

Inventor
Abraham Shapiro,
By Rummler, Rummler & Woodworth,
Attys.

April 26, 1932.   A. SHAPIRO   1,855,775
FILM TENSIONING MEANS FOR CINEMATOGRAPHS
Filed March 20, 1930   3 Sheets-Sheet 2
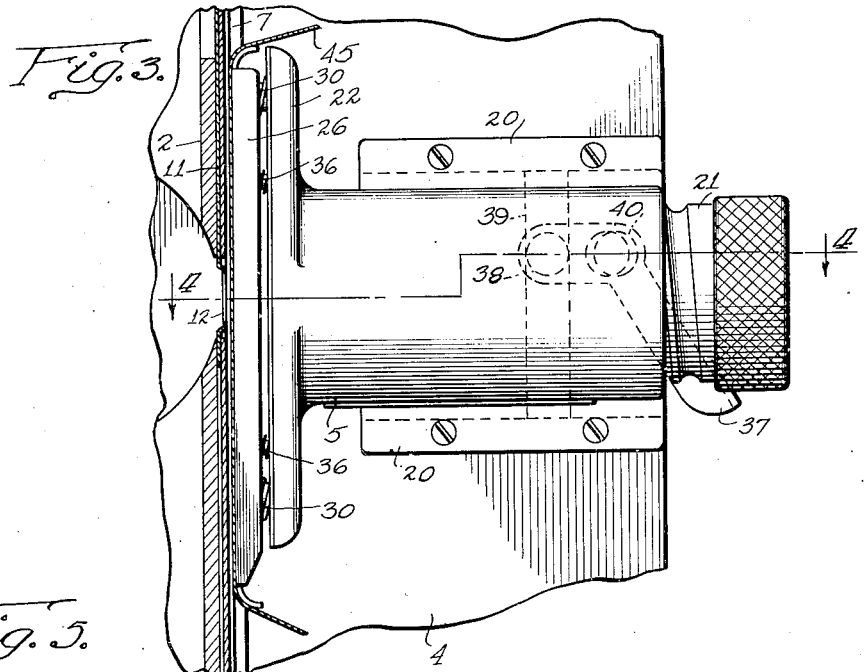
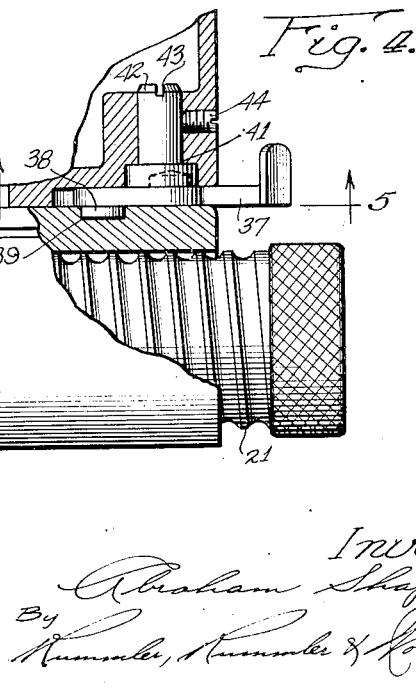
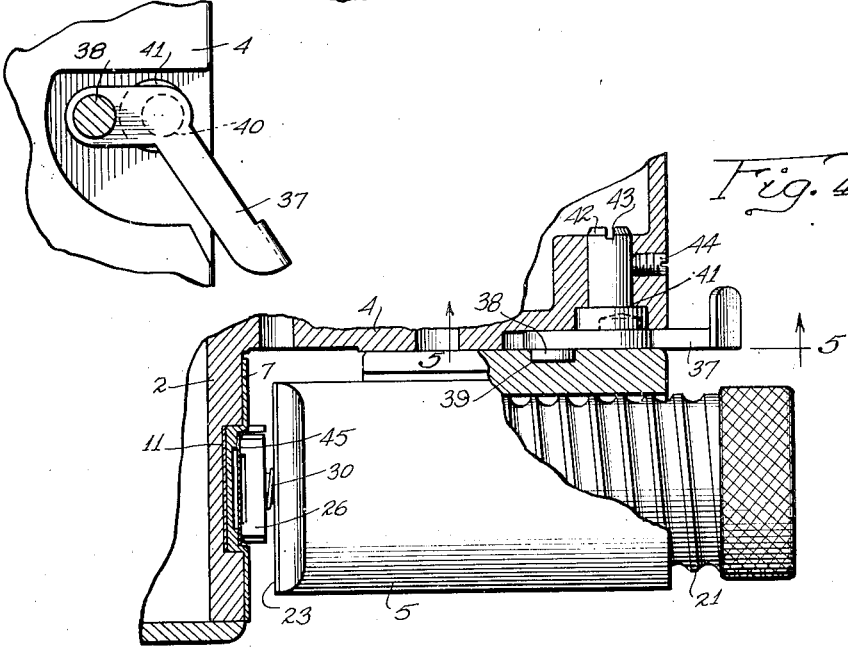

April 26, 1932.  A. SHAPIRO  1,855,775
FILM TENSIONING MEANS FOR CINEMATOGRAPHS
Filed March 20, 1930   3 Sheets-Sheet 3
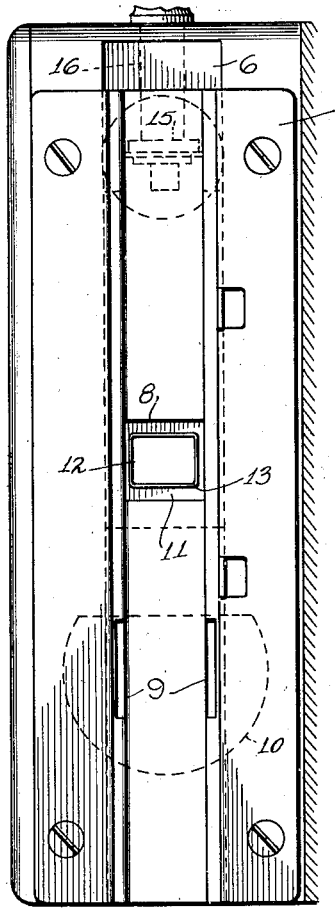
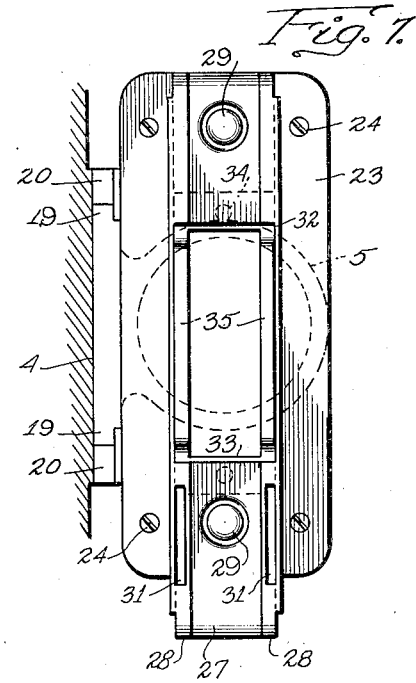
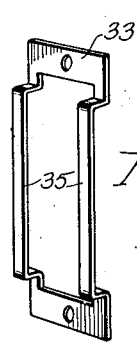
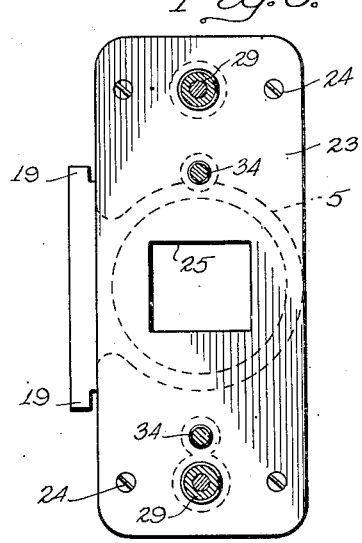

Patented Apr. 26, 1932

1,855,775

UNITED STATES PATENT OFFICE

ABRAHAM SHAPIRO, OF CHICAGO, ILLINOIS, ASSIGNOR TO UNIVERSAL STAMPING & MFG. CO., OF CHICAGO, ILLINOIS, A CORPORATION OF ILLINOIS

FILM TENSIONING MEANS FOR CINEMATOGRAPHS

Application filed March 20, 1930. Serial No. 437,458.

This invention relates to motion picture projecting machines.

In projecting machines, suitable feeding means, such as a claw, is provided for positively moving the film in a rapid intermittent motion across the light path so as to momentarily position each picture directly in front of the light aperture. Because of the high speed at which the film is operated, it has a tendency to continue its motion during the retraction or return movement of the feeding claw. For this reason, projecting machines are usually provided with friction shoes which tension the film so as to stop it abruptly at the end of each feeding stroke of the claw.

If the film is not stopped abruptly at the end of each feeding stroke of the claw, the pictures on the film do not properly register with the light aperture. Any variation in the position of the picture at the light aperture is always greatly magnified on the screen and, therefore, it is highly desirable that every picture on the film be stopped in exactly the same position in the path of light.

The friction pads heretofore in use have not been entirely satisfactory because they have not been sufficiently sensitive to quickly respond to variations in the thickness of the film and, consequently, when the film varied in thickness, there was not a uniform distribution of pressure.

The main objects of this invention are to provide a motion picture projector having an improved form of friction shoe which is sensitive to variations in the thickness of the film and which will exert a uniform amount of pressure on the film adjacent the light aperture where the pressure is mostly needed; to provide film tensioning means of this kind which will cause every picture on the film to stop in exactly the same position in the light path and thereby insure an even picture on the screen; to provide improved means for adjusting the friction shoe toward and from the film so as to permit a variation in the pressure when desired; and to provide an improved form of framer for framing the film.

An illustrative embodiment of this invention is shown in the accompanying drawings, wherein:—

Fig. 3 is a side elevation of the front part of the machine, a portion of the casing being shown in section, and the tensioning means being shown in operative position.

Fig. 4 is a horizontal section, partly in elevation, taken on the line 4—4 of Fig. 3.

Fig. 5 is a vertical section, taken on the line 5—5 of Fig. 4 and showing the means for shifting the tensioning shoe.

Figure 1:
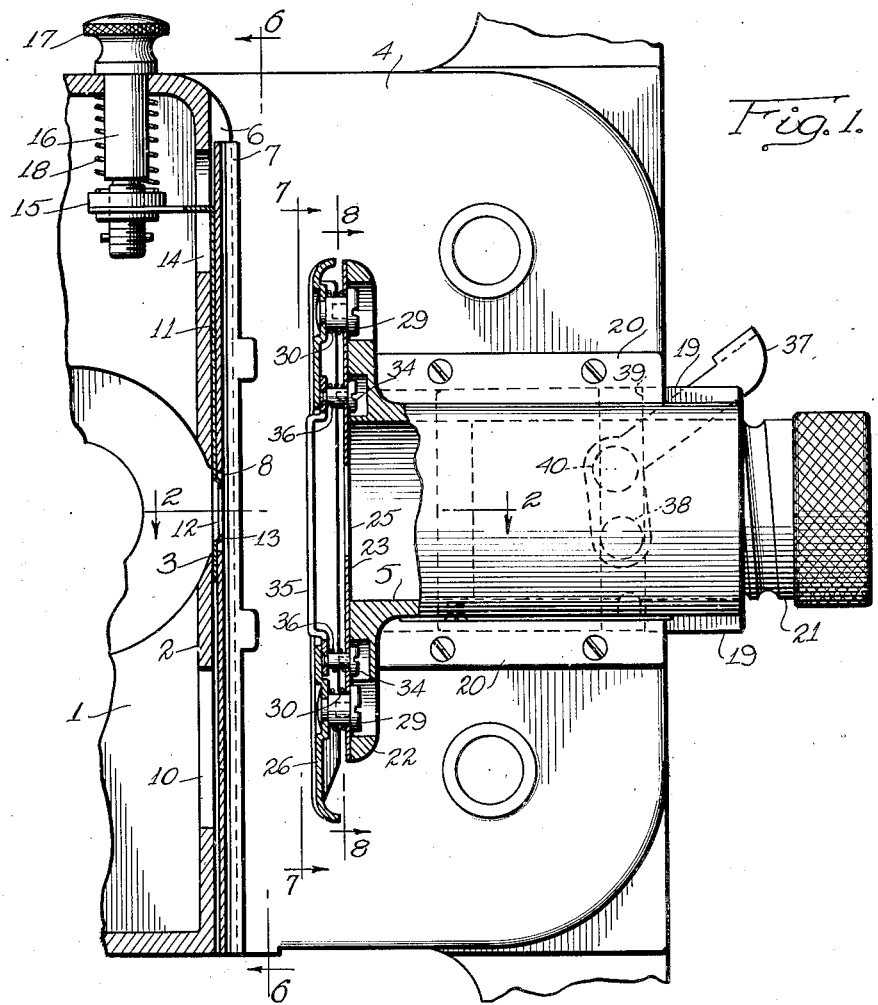
Figure 1 is a fragmentary vertical section of the front part of a cinematograph to which an improved tensioning device has been applied.
Figure 2:
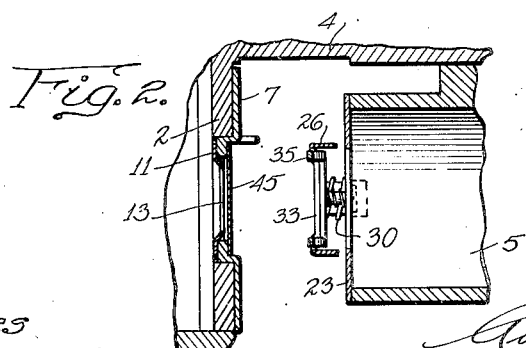
Figure 2 is a fragmentary horizontal section taken on the line 2—2 of Figure 1.

Figs. 6, 7 and 8 are vertical sections taken on the lines 6—6, 7—7, and 8—8, respectively, of Fig. 1.

Fig. 9 is a perspective of a part of the tensioning means.

Inasmuch as this invention relates particularly to only certain parts of a cinematograph, the accompanying drawings show only as much of the entire projector as will be of assistance in apprehending the invention.

Cinematographs generally include an upright casing having a rear compartment for housing the usual light bulb and a forward compartment in which is mounted a rotatable light interceptor arranged directly behind a light aperture in the film guideway. The film is fed rapidly through the guideway by suitable feeding means, such as a reciprocating claw, for momentarily positioning each picture directly in the path of light. The projector casing is generally angularly adjustable so as to permit the light field to be accurately positioned on the receiving screen.

In addition to accurately positioning the light field on the receiving screen, it is necessary to project each picture onto the screen within the border of the light field. For this reason, most projecting machines are equipped with a framing device for framing the film.

In the construction illustrated, the casing of the machine, which is only partly shown, includes a compartment 1 having a front wall 2 provided with a central aperture 3, and a side wall 4, which extends forwardly for supporting a lens mounting 5.

The compartment 1 houses the light interceptor, not shown, which interrupts the rays of light which are projected forwardly through the aperture 3 from a lamp located in a rear compartment.

Formed in the front wall 2, is a vertically disposed recess 6, in which is seated a film guide 7 which is similar in construction to that shown in my co-pending application Serial No. 370,522. Formed in the guide 7, is a light aperture 8, which registers with the aperture 3. Located below the aperture 8, is a pair of slots 9, which register with an opening 10 in the front wall 2 for accommodating the prongs of the feeding claw, not shown.

In the form shown, the framer comprises a comparatively thin bar 11 which is slidably mounted in the recess 6 between the wall 2 and guide 7. Formed in the bar 11, is an aperture 12 adapted to be positioned between the apertures 3 and 8. An inclined peripheral flange 13 surrounds the aperture 8. The upper end of he bar 11 is bent inwardly and projects through an opening 14 in the wall 2 for attachment to a collar 15 which is threaded on the lower end of a stud 16.

The stud 16 is rotatably mounted in the upper wall of the casing and has a knob 17 by which it may be turned for vertically adjusting the framer. Embracing the stud 16, is a spring 18 bearing between the collar 15 and the casing for preventing any play between the collar and the threads of the stud.

In the construction illustrated, the lens mounting 5 comprises a cylindrical shell having a pair of flanges 19, which are slidable in a pair of horizontal rails 20 secured to the wall 4. Mounted in the shell 5, is a ferrule 21 which supports the lens, not shown.

Formed on the inner end of the shell 5, is a flange 22, to which a vertical plate 23 is secured by screws 24. The plate 23 has a central opening 25 and forms the support for the improved tensioning device.

In the form shown, the improved tensioning device comprises a shoe 26 having a depressed central portion 27 and a pair of spaced rails 28 adapted to frictionally engage the margins of the film. The shoe 26 is secured to the plate 23 by a pair of studs 29. Embracing the studs 29, are helical springs 30 urging the shoe toward the film guideway for exerting pressure on a certain portion of the film.

Formed in the rails 28, are slots 31 registering with the slots 9 for receiving the film feeding claw, not shown.

The depressed portion 27 of the shoe has a central opening 32 for receiving an independently yieldable section 33, which is secured to studs 34 loosely mounted on the plate 23. The section 33 has a pair of spaced rails 35 which form continuations of the rails 28 for frictionally engaging the margins of the film immediately adjacent the light aperture.

Embracing the studs 34, are springs 36 which urge the section 33 toward the film guideway. The springs 36 are lighter than the springs 30 so that the yieldable section 33 is more sensitive than the body of the shoe which is acted upon by the springs 30. The rails 35 project beyond the plane of the rails 28 so as to engage the film in advance of the body of the shoe.

In order to permit insertion of the film into the guideway, means is provided for axially shifting the lens mounting. The means for shifting the lens mounting comprises a bell crank lever 37 having a boss 38 which rides in a vertical recess 39 formed in the shell 5 so that the movement of the lever around its axis effects an axial movement of the shell.

The lever 37 has a pivot 40 seated in an eccentric 41 which is provided with a shank 42 rotatably supported in the wall 4 so that, by turning the eccentric, the pivotal axis of the lever is shifted so as to vary the tension of the friction shoe upon the film. A slot 43 is formed in the inner end of the shank 42 for receiving a screw driver. In order to secure the eccentric against accidental turning, a set screw 44 is mounted on the casing for engagement with the shank 42.

A film 45 is supported by the usual reels, not shown.

In operation, to insert a film, the lever 37 is raised to the position shown in Fig. 1, so as to retract the mounting 5 and the tensioning shoe. After the film has been inserted into the guideway 7, the lever 37 is depressed for urging the friction shoe 26 and the yieldable section 33 into contact with the film.

The film is fed downwardly in the usual manner for momentarily positioning each picture in the path of light. In the event that the pictures are not properly framed in the light field on the screen, the knob 17 is turned for adjusting the framer bar 11.

With the improved tensioning shoe herein shown and described, the portion of the film adjacent the path of light is always under tension so that every picture stops in exactly the same position in the path of light. If it is desired to adjust the pressure of the tensioning means, the eccentric 41 is turned so as to shift the axis of the lever 37. This adjustment is usually effected prior to shipment of the machine.

Although but one specific embodiment of this invention has been herein shown and described, it will be understood that numerous details of the construction shown may be altered or omitted without departing from the spirit of this invention as defined by the following claims.

I claim:

1. A cinematograph comprising a casing having a vertical wall provided with a light opening therein, a vertical guideway on said wall for guiding a cinema film, a vertically shiftable framer bar mounted on said wall and having a picture framing aperture adapted to register with said opening, a stud rotatably mounted on the top of said casing, a collar threaded on said stud and secured to said framer bar for vertically adjusting said bar, and a spring embracing said stud and bearing between said collar and the top of said casing.

2. A cinematograph comprising a casing having a vertical front wall provided with a light opening therein, a vertical guideway on the front face of said wall for guiding a cinema film, a vertically shiftable framer bar located between said front wall and film guideway, said bar having a picture framing aperture adapted to register with said opening, the upper end of said bar projecting rearwardly through said front wall, a stud rotatably mounted on the top of said casing, and a collar threaded on said stud and secured to said upper end of the bar for vertically adjusting said bar.

3. A cinematograph comprising a casing having a wall provided with a light aperture, a film guideway on said wall, a lens mounting adjustably supported on said casing in front of said guideway, a friction shoe on the rear end of said lens mounting for exerting pressure on the film, an eccentric mounted on said casing, and a bell crank pivoted on said eccentric and arranged to shift said lens mounting axially for moving said shoe into and out of engagement with the film, said eccentric being adjustable for shifting the pivotal axis of said lever so as to permit variation of the pressure upon the film.

Signed at Chicago this 17th day of March, 1930.

ABRAHAM SHAPIRO.